Patented Nov. 27, 1951

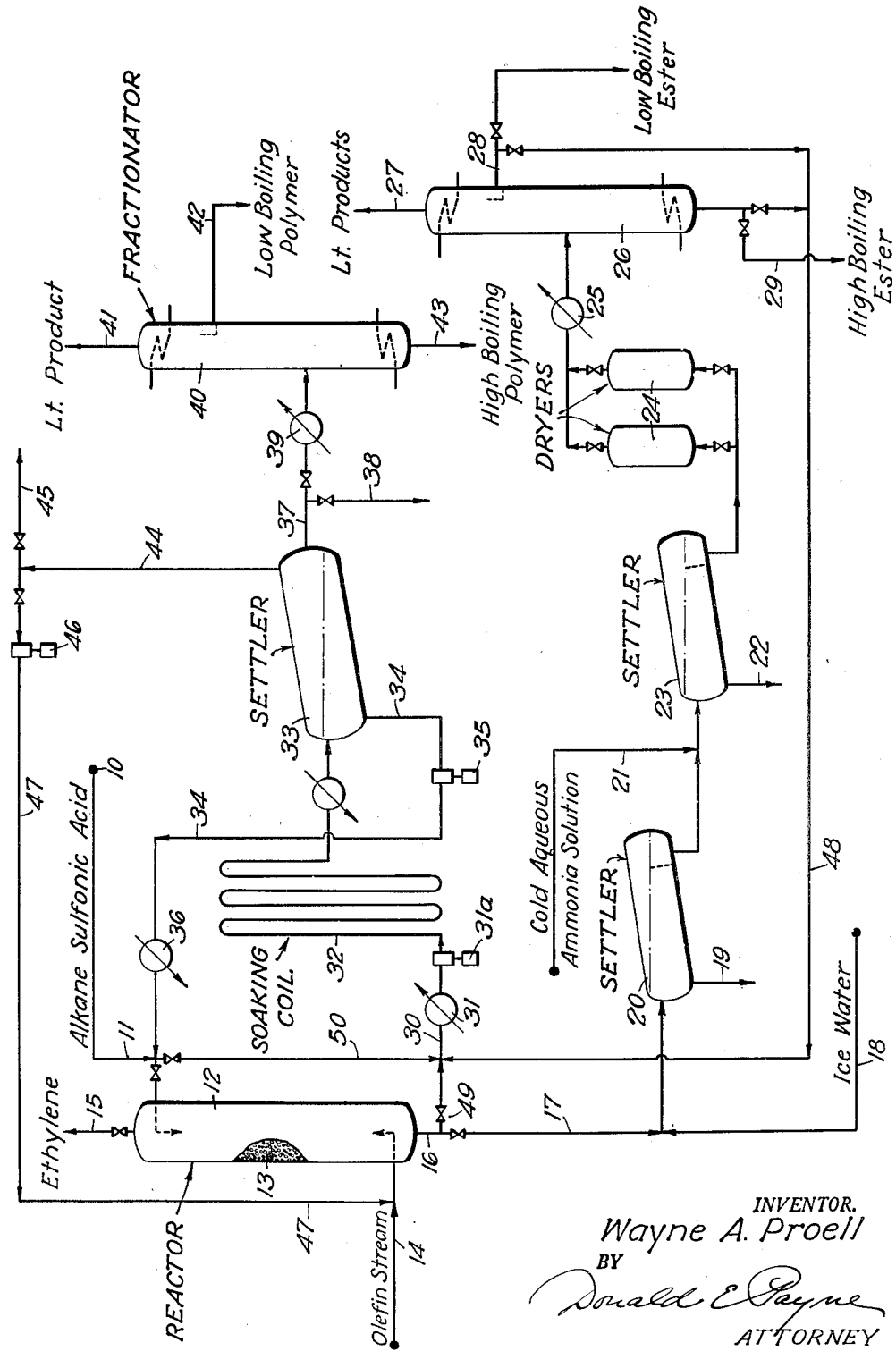

2,576,535

UNITED STATES PATENT OFFICE 2,576,535

TREATING OLEFINS WITH ALKANE-SULFONIC ACID

Wayne A. Proell, Chicago, Ill., assignor to Standard Oil Company, Chicago, Ill., a corporation of Indiana Application February 10, 1948, Serial No. 7,465

3 Claims. (Cl. 260—456)

This invention relates to improved methods and means for treating olefins with alkanesulfonic acids and particularly to esterification and/or polymerization of olefins having three to eight or more carbon atoms per molecule. This is a continuation-in-part of my copending application Serial No. 704,993, filed October 22, 1947, now abandoned.

An object of this invention is to provide an improved method and means for reacting alkanesulfonic acids with olefins containing more than 2 but less than 16 carbon atoms per molecule to produce esters. A further object is to provide an improved method and means for obtaining substantially pure ethylene from an ethylene-containing mixture of normally gaseous olefins such as propylene, butenes, etc.

A further object is to provide improved methods and means for polymerizing secondary olefins. A further object is to provide an olefin polymerization process in which side reactions are substantially eliminated. A further object is to provide an olefin polymerization process directed to the production of particular polymer products. Another object is to provide a process wherein the concentration (strength) of the polymerization catalyst may vary throughout wide limits without appreciably affecting product distribution. A specific object is to provide an improved method and means for producing dimers of isobutylene dimer, propylene trimer, etc.

An important object of the invention is to provide an olefin conversion process which will reduce treating losses and avoid oxidizing effects. A further object is to provide a catalyst which may be employed at high concentration without producing hydrogen disproportionation reactions (hydrogen transfer). Other objects will become apparent as the detailed description of the invention proceeds.

It has been found that alkanesulfonic acids containing 1 to 5 carbon atoms inclusive and mixtures thereof have unique properties for effecting olefin esterification and polymerization. Hereinafter where reference is made to alkanesulfonic acids or their esters, it will be understood that they contain 1 to 5 carbon atoms, inclusive, in the alkyl group, R, where the formula for the acids is $RSO_3H$ and of the ester is $RSO_3R'$. Alkanesulfonic acids are very different in their effects from aromatic sulfonic acids such as benzenesulfonic acid and toluenesulfonic acid and they make possible the avoidance of the many problems and difficulties which are inevitably encountered when olefins are treated with sulfuric acid. The primary reaction of olefins having more than two carbon atoms is to add to the alkanesulfonic acids to form esters and at ordinary temperatures the esters so formed are stable. At higher temperatures these esters are unstable in the presence of free alkanesulfonic acids and olefin polymers are formed unless an aromatic compound is present, in which case alkylation of the aromatic compound takes place preferentially.

Ethylene does not react with anhydrous alkanesulfonic acids at room temperature under pressures up to 40 p. s. i. g. or at temperatures up to 230° F. at atmospheric pressure. Likewise, acetylene does not react with alkanesulfonic acids under atmospheric pressure in the temperature range of about 70 to 230° F. Secondary and tertiary olefins form alkanesulfonic esters. A mixture of simple monoolefinic hydrocarbons which includes ethylene may be contacted with alkanesulfonic acids to effect removal by esterification and/or polymerization of all olefins except ethylene, thus leaving the unreacted ethylene for use in processes where this relatively pure olefin is desired, e. g. in polymerization to form polyethylene plastics of high molecular weight. No ethylene is lost by esterification, polymerization or copolymerization and most of the small amount of ethylene which dissolves in reaction products formed in the contacting step may be easily recovered.

The contacting step for effecting esterification of olefins containing 3 to 16 carbon atoms per molecule should be at a temperature of the order of about 50° to 100° F. Esterification will proceed slowly at somewhat lower temperatures. For esterification the temperatures should not exceed about 140° F. because at higher temperatures considerable olefin polymerization takes place. Secondary olefins of 3 to 16 carbon atoms give relatively stable esters at about room temperature but tertiary olefins, such as isobutylene or trimethylethylene tend to give polymers (isobutylene giving chiefly trimer) even at about room temperature.

The alkanesulfonic esters formed from alkanesulfonic acids having 1 to 5 carbon atoms, inclusive, in the molecule and monoolefinic hydrocarbons (other than ethylene) are stable only when they are pure and free from alkanesulfonic acid. Under the conditions of formation from olefins they are reasonably stable only at temperatures below about 140° F. The rate of ester formation, at least during the initial stage, appears to depend chiefly on the intimacy of contact or efficiency with which the olefin and acid are mixed. After reaction has approached completion the reaction velocity is reduced, perhaps due to the low concentration of residual alkanesulfonic acid in the reaction mixture. With dry alkanesulfonic acids substantially quantitative reaction can usually be obtained in 24 hours or less.

The esters may be freed from unreacted alkanesulfonic acid by washing with ice water and then with cold aqueous ammonia or by any other known means. The wet ester can then be thoroughly dried and the resulting crude ester product can be distilled under reduced pressure without decomposition to give substantially pure individual esters.

When alkanesulfonic esters are heated in the presence of a small catalytic amount of alkanesulfonic acid at temperatures of the order of 140° F. to 250° F. the alkanesulfonic acids are regenerated or reformed and olefin polymers are produced. This ester conversion slowly takes place at lower temperatures if the esters are stored in the presence of even very small amounts (trace) of alkanesulfonic acids. Olefin polymer formation at 140–250° F. shows the peculiarity of a relatively long induction period which may be of the order of 10 to 60 minutes. When the induction period is over, a sudden reaction occurs and the formation of olefin polymers is complete in a few minutes with a concomitant temperature rise which may amount to about 75 to 175° F. Polymer formation is accompanied by immediate separation of the initially homogeneous alkanesulfonic ester into two immiscible liquid phases, viz., olefin polymer and regenerated alkanesulfonic acid. Olefin polymers may also be obtained simply by contacting olefins with the alkanesulfonic acids at the higher temperature, the amount of acid employed in this case usually being in the range of about 5 to 50%, preferably about 10 to 40% by weight based on total olefins undergoing contact. As previously pointed out, isobutylene polymerizes rapidly at room temperature; propylene on the other hand polymerizes relatively slowly at temperatures as high as 230° F.

Considerably different types of polymers may be produced by alkanesulfonic acid polymerization. So-called "homogeneous polymers" consisting of a series of well-defined multiples of the monomer are readily formed from pentene-1 polymerization while so-called "heterogeneous" polymer is readily formed from propylene and n-butenes, the heterogeneous polymer being characterized by a distillation curve which is rather gradual and not marked by distinct plateaus, indicating the formation of olefinic hydrocarbon products whose molecular weights are not integral multiples of the molecular weight of the monoolefin charging stock. It is difficult to explain why isobutylene should yield a homogeneous polymer (chiefly trimer) while normal butenes yield a heterogeneous polymer.

When diisobutylene (2,4,4-trimethyl pentenes) is contacted with alkanesulfonic acids in the lower portion of the temperature range and for short reaction times, the product is almost entirely isobutylene tetramer and unchanged diisobutylene. Thus, contacting diisobutylene with a 91% strength mixture of $C_1$-$C_4$ alkanesulfonic acids at about 140 to 160° F., for 2½ hours gave a product which consisted of about 32% unreacted diisobutylene and about 66% of isobutylene tetramer. With a 95% strength mixture of $C_1$-$C_4$ alkanesulfonic acids at about the same temperature but with about 10 hours' contact time, diisobutylene yielded a product containing about 26% of unreacted diisobutylene and about 70% of isobutylene tetramer. With 99% ethanesulfonic acid at a temperature of about 155° F. and a time of contact of about 15 minutes the product contained about 11% unreacted diisobutylene feed stock, 13% isobutylene trimer and 76% isobutylene tetramer with less than 2% heavier than tetramer.

It has been found that with longer contact times and/or at higher temperatures product distribution can be markedly altered in the case of diisobutylene polymerization. Thus when diisobutylene is contacted with a 95% strength mixture of $C_1$-$C_4$ alkanesulfonic acids at 212° F. for 1.25 hours, 11% of isobutylene trimer was obtained along with 27% unreacted diisobutylene and 59% of isobutylene tetramer. Contacting diisobutylene with 99% ethanesulfonic acid at 212° F. for 2 hours yielded a product containing 48% of isobutylene trimer and only 34% of isobutylene tetramer with about 6% of polymer of higher molecular weight than isobutylene tetramer. Thus with prolonged reaction the so-called homogeneous polymers tend to be converted into heterogeneous polymers and the same phenomenon is observed in a simple isobutylene polymerization where the main initial product at short contact times is chiefly trimer.

The isobutylene tetramer obtained by polymerizing diisobutylene with mixed $C_1$-$C_4$ alkanesulfonic acids at about 150° F. for periods up to about 2 hours appears to be unique in that it has a very narrow boiling range of about 460 to 464° F. indicating that it is a very pure tetramer probably including only one or two individual hydrocarbons. The refractive index of this tetramer was found to be about 1.4430. In view of the large number of possible isobutylene tetramer isomers it is remarkable that this process yields such a large quantity of such a specific product.

When it is desired to utilize a refinery stream containing a mixture of ethylene with propylene, the propylene can first be separated from the stream by contacting it with alkanesulfonic acid at about room temperature. The resulting propylene ester (isopropyl alkanesulfonate) can then be separately converted under controlled conditions to obtain propylene polymer and to regenerate alkanesulfonic acid; a small amount of ethylene, apparently dissolved in the ester, is liberated upon conversion of the ester and can be recycled to the contacting step. The invention and particularly this aspect thereof will be more clearly understood from the following detailed description read in conjunction with the accompanying drawing which is a schematic flow sheet of a plant for practicing the invention.

The alkanesulfonic acids employed in the practice of this invention may be produced by extracting alkyl disulfides from a petroleum naphtha, contacting the alkyl disulfides in a packed tower with air containing 1 to 4% nitrogen dioxide at a pressure of about 50 to 100 p. s. i. g. at a temperature of about 75 to 175° F., as more fully described in U. S. Patents 2,433,395–6. These alkanesulfonic acids are reactive, strong, organic acids of unusual chemical stability. They usually vary in assay from about 93 to 100%, the impurities being water, sulfuric acid and traces of sulfoxides; for the present purpose the acids may range from 80% to upwards of 100%, a fuming sulfonic acid being producible by fortification of a strong acid with sulfonic acid anhydride. I prefer to employ alkanesulfonic acids having concentrations in excess of about 90 weight percent, best 95 weight percent or more. While these alkanesulfonic acids are hygroscopic, they are less so than sulfuric acid and they do not oxidize or char organic materials like concentrated sulfuric acid does. They are very corrosive toward common metals but may be handled in stainless steel equipment, particularly if the acid contains at least about .5 to 1% of sulfuric acid. The corrosion of ferrous metals by alkanesulfonic acids may be reduced by the addition thereto of a small proportion, say 1 weight percent, of phosphoric acid. The alkanesulfonic acids are stable at temperatures below 300° F., have low vapor pressures and are inert to chlorine and oxygen. They offer many advantages over the use of sulfuric acid not only because of the almost quantitative olefin polymer yields but because their employment entails less careful control of the reaction conditions and they are not so rapidly inactivated by carbonaceous material. Physical properties of the individual alkanesulfonic acids are approximately as follows:

*Physical properties of $C_1$-$C_4$ alkanesulfonic acids*

| Compound | B. P. °C. | B. P. at mm.Hg | M. P., °C. | Specific Gravity, 25°/4° C. |
|---|---|---|---|---|
| $CH_3SO_3H$ | 122 | 1.0 | +20 | 1.4844 |
| $CH_3CH_2SO_3H$ | 123 | 1.0 | −17 | 1.3341 |
| $CH_3CH_2CH_2SO_3H$ | 136 | 1 | +7.5 | 1.2516 |
| $CH_3CH(SO_3H)CH_3$ | 123ª | 1 | | |
| $CH_3CH_2CH_2CH_2SO_3H$ | 147 | 0.5 | −15.2 | 1.1906 |

The properties of representative alkanesulfonic acid mixtures are as follows:

*Mixed alkanesulfonic acids*

Average molecular weight_____ 110–120
Specific gravity (25°/4° C.)_____ 1.30–1.35
Color_____ Light amber
Composition, weight percent:
  Alkanesulfonic acids_____ 94
  Water_____ 3
  $H_2SO_4$_____ 3
  Ash_____ Less than 0.05

Referring to the drawing, such a sulfonic acid or sulfonic acid mixture from source 10 may be introduced by line 11 to the upper part of tower 12 which may be provided with Raschig rings or other suitable packing material 13. A petroleum refinery stream containing ethylene, propylene and normal butylenes is introduced at the base of the tower through line 14. The tower is preferably operated at about room temperature, i. e. about 80 to 100° F. under a pressure of about atmospheric to about 50 p. s. i. g. or higher. It is desirable to use such a volume of acid feed as to keep temperature in tower 12 below 140° F., as there is a considerable heat of ester formation especially when feed from 14 is rich in $C_3+$ olefins. Alternatively, a cooling coil may be included in tower 12 to keep the liquid ester below 140° F. as it forms. The charge rates should be such as to maintain a substantial excess of free sulfonic acid even in the lower part of the tower and the flow rate or tower height should be sufficient to permit esterification of all olefins except ethylene. A contact time of the order of 10 to 60 minutes or more is preferred. Unreacted ethylene is removed from the top of the tower through line 15 and alkanesulfonic esters with excess acid are removed from the base of the tower through line 16. If the olefin stream contains paraffin hydrocarbons the overhead ethylene stream may contain ethane and higher boiling paraffins and paraffins may likewise be dissolved in the ester stream withdrawn through line 16; such paraffins may be subsequently removed from products by simple distillation or other known methods. The separation of ethylene from other simple olefins is remarkably efficient and complete because the ethylene neither esterifies nor polymerizes and hence may be removed almost quantitatively while other olefins (assuming the absence of acetylene) may be quantitatively reacted.

Where it is desired to obtain alkanesulfonic acid esters the ester stream may be withdrawn through line 17 and cooled for example by intimate mixture with ice water introduced through line 18. Following separation of the aqueous acid layer by line 19 from settler 20 the residual acid may be neutralized by introducing a cold 10% aqueous ammonia solution from line 21 and after intimate mixing and contacting in apparatus (not shown) designed for that purpose, the aqueous layer is withdrawn by line 22 from settler 23. After sufficient neutralization and washing steps to effect removal of substantially all of the free acid, the wet ester is passed through one or more drying towers 24 which may contain granular anhydrous Drierite ($CaSO_4$) or other known drying agent. The dry ester may then be heated in heater 25 and introduced into a fractionating column 26 which is provided with suitable reflux means at its top and heating means at its base. Light products may be withdrawn through line 27, a low boiling ester through line 28 and a high boiling ester through line 29. It should be understood of course that the illustrated system is diagrammatic and intended to be conventional; the distillation is preferably effected at reduced pressure which may be of the order of about 1 to 20 mm. of mercury absolute. It is important that all of the acid be removed prior to distillation because traces of acid during the distillation step may cause autocatalytic decomposition which results in a sudden violent surge of olefin polymer formation. While the separation of two ester fractions is illustrated it should be understood that individual esters may be separated from each other by fractionation into a sufficient number of streams.

When it is desired to produce olefin polymers instead of esters the acid-containing ester stream from line 16 is preferably passed thru line 30 to heater 31 and pump 31A and thence through coils 32 and a cooler to settler 33. The amount of free acid in this stream may initially be very small, i. e. about 1 to 5% or less, but acid is released by the polymerization step so that in coils 32 there will be ample acid (at least 5 to 50% by weight) to catalyze the reaction. Excessive amounts of acid are not detrimental. In the heater the temperature of the stream should be increased to about 140 to 250° F. and the pressure may be atmospheric to several hundred pounds per square inch, e. g. about 15 to 40 p. s. i. In order to provide for the necessary induction period and for the dissipation of heat of reaction the heated mixture may be passed through a long reaction or soaking coil or series of coils 32. As above stated, the induction period may require about 10 to 30 minutes or more but polymerization is thereafter very rapid. The polymerization step converts the homogeneous alkanesulfonic ester phase into a liquid olefin polymer phase and an immiscible regenerated alkanesulfonic acid phase, respectively, the latter preferably being withdrawn from the base of settler 33 through line 34 and recycled by pump 35 through cooler 36 back to the top of contacting tower 12. Since the acid is almost quantitatively recovered and is not seriously impaired by accumulations of carbonaceous material or sludge, very little make-up acid has to be introduced from source 10 during continued operation.

The liquid polymer is withdrawn from the upper liquid phase in settler 33 by line 37 and it may be either withdrawn from the system through line 38 or passed at reduced pressure through heater 39 to fractionating column 40 provided with conventional reflux means at its top and heating means at its base. Here again the fractionation is preferably effected at reduced pressure and although the drawings illustrate fractionation into light products withdrawn through line 41, low boiling polymer withdrawn through line 42 and high boiling polymer withdrawn through line 43, it should be understood that any degree of fractionation or any desired number of products may be thus separated.

Any dissolved ethylene which is carried with the ester stream from the base of tower 12 through line 16 is released in settler 33 and withdrawn from the top of the settler through line 44; such ethylene may either be withdrawn through line 45 or recycled by pump 46 or 47 to the base of tower 12.

In some cases it may be advantageous to produce and separate esters prior to the polymerization step. Thus a particular ester stream from fractionator 26 may be introduced by line 48 to heater 31, coils 32 and heater 43 with valve 49 being closed and with alkanesulfonic acid being admixed with the ester from line 50. The amount of alkanesulfonic acid required for catalizing polymer formation is very small and may be in the range of about 1 to 5% or less since acid is released by the polymerization itself, as hereinabove pointed out. Another method of operation is to operate contacting tower 12 at sufficiently high temperature to effect polymerization as well as esterification therein.

The esterification reaction is applicable generally to olefins containing more than two but less than sixteen carbon atoms and is particularly applicable to olefins of about three to eight carbon atoms. For example, propylene reacts with alkanesulfonic acids at a moderate rate at 40 p. s. i. g. and about 85° F. and it reacts somewhat slower at this temperature when the pressure is atmospheric. Butene-2 reacts very rapidly at a pressure of 15 p. s. i. g. and a temperature of about 85° F. to give almost quantitative yields of esters. Isobutylene reacts very rapidly even at atmospheric pressure and a temperature of about 85° F. to give polymer but it gives no appreciable reaction at temperatures as low as 5° F. Pentene-1 reacts slowly at temperatures of the order of 50 to 85° F. and at atmospheric pressure to give large yields of corresponding esters. Octene-2 reacts slowly at atmospheric pressure and at a temperature of about 85° F. to give ester formation. Under these conditions even diisobutylene reacts slowly to produce esters but n-hexadecene-1 gives substantially no reaction. Substituted olefins such as allyl chloride and methallyl chloride react very slowly. The required time of contact depends considerably on the intimacy of contacting which is obtainable as well as on the temperature, pressure and the nature of the olefin undergoing esterification; generally speaking, times of contact may be in the range of about 10 minutes to about 10 hours, the optimum time in any given case being easily ascertainable by preliminary tests.

As pointed out above, polymerization may be effected either by heating preformed alkanesulfonic acid esters in the presence of alkanesulfonic acid or by introducing olefins into alkanesulfonic acid at polymerization temperatures. The temperatures required for effecting polymerization in the presence of alkanesulfonic acid vary with the olefin used. Isobutylene polymerizes rapidly at room temperature but propylene polymerizes relatively slowly at temperatures as high as 230° F. For secondary olefins, polymerization temperatures are usually in the range of about 140 to 250° F. Propylene ester of methanesulfonic acid in the presence of a catalytic amount of alkanesulfonic acid reacts very rapidly after an initial induction period at temperatures of the order of 200° F. to give a heterogeneous propylene polymer in yields upwards of 50–70%. 100% yields of propylene polymers were obtained by introducing propylene at approximately 200° F. into a mixture of 97% mixed $C_1$-$C_4$ alkanesulfonic acids although in this case the rate of polymerization was relatively low. Butene-2 polymerized rapidly at 140 to about 200° F. when introduced into 100% methanesulfonic acid at that temperature, giving a heterogeneous polymer. Isobutylene on the other hand when introduced into 96% mixed $C_1$-$C_4$ sulfonic acid catalyst at about 212° F. polymerized very rapidly to give a 100% yield of a product of which about 80% was triisobutylene, about 5% was tetraisobutylene and about 15% isobutylene dimer. The pentene-1 ester of mixed 96% $C_1$-$C_4$ alkanesulfonic acids when heated in the presence of acid at about 212° F. rapidly polymerized after an initial induction period to give a 43% yield of a product showing distinct plateaus at the pentene dimer and trimer portions of the distillation curve. The polymerization of octene-2 was effected at a moderate rate by heating an alkanesulfonic acid ester thereof in the presence of acid at a temperature of approximately 212° F. Normal tetradecene reacted very slowly with 99% acid at 100° C. yielding 5% of ditetradecene in 2 hours.

The polymerization of diisobutylene (2,4,4-trimethyl pentene) with alkanesulfonic acids yields products whose composition depends upon the temperatures and contact times employed. The following tabulated results are illustrative.

| Catalyst | Diisobutylene Polymerization | | | | | |
| --- | --- | --- | --- | --- | --- | --- |
| | Time | Temperature | Product | | | |
| | | | dimer | trimer | tetramer | higher |
| | | °F. | Per cent | Per cent | Per cent | Per cent |
| 95% mixed $C_1$-$C_4$ acids | 10 hrs. | 140–160 | 26 | small | 70 | small |
| 99% $C_2$ acid | 2 hrs. | 86 | | | trace | |
| Do | 15 min. | 155 | 11 | 13 | 76 | |
| Do | 15 min. | 212 | 11 | 56 | 29 | 5 |
| Do | 2 hrs. | 212 | 12 | 48 | 34 | 6 |
| 95% mixed $C_1$-$C_4$ acid | 1.25 hrs. | 212 | 27 | 11 | 59 | |
| 91% mixed $C_1$-$C_4$ acid | 2.5 hrs. | 140–160 | 32 | 1 | 66 | |

Thus although polymerization may take place rather slowly at temperatures in the range of 40 to 140° F., the more practical polymerization temperatures are in the range of about 140 to 240° F. Effective conversion may be produced in a matter of 10 minutes to several hours, less contact time being required with large amounts of sulfonic acid. By proper control of contact time a product may be produced which contains upwards of 70% tetramer but if contacting is continued too long the product will tend to be more and more heterogeneous.

The polymer product produced by reacting 500 volumes of diisobutylene in the presence of 50 volumes of 95% mixed $C_1$-$C_4$ alkanesulfonic acid at a temperature of about 150° F. and for a time of about 2 hours was found to have a refractive index, $n_D^{20}$, of about 1.4430 and a distillation range as follows:

| Distillate, Vol. Per Cent | B. P., ° C. |
|---|---|
| Initial | 90 |
| 10 | 130 |
| 20 | 188 |
| 30 | 228 |
| 40 | 237 |
| 50 | 238 |
| 60 | 238 |
| 70 | 238 |
| 80 | 240 |
| 90 | 240 |
| 100 | --------- |

The above distillation analysis shows that the product contains about 70% of a tetramer of very narrow boiling range, about 237–240° C. (about 460–464° F.). This very narrow boiling range indicates that the isobutylene tetramer fraction contains very few, probably 1 or 2, individual hydrocarbons. In view of the large number of isobutylene tetramer isomers it is most remarkable that this process yields such a large quantity of such a specific product. Careful distillation on a 20 plate vacuum column showed that practically all of the tetramer fraction boils at about 271–2° F. at the pressure of 31 mm. of mercury. Another example of the remarkable properties of alkanesulfonic acids is their ability to produce dimers of propylene trimers, i. e. to convert a $C_9$ olefin to a $C_{18}$ olefin. A propylene trimer boiling in the range of about 270 to 280° F. was contacted with about 40% by volume with mixed alkanesulfonic acid in a stirred reactor at an average temperature of about 220° F. for a period of about 2½ hours. The distillation curve of the resulting product indicates that only about 3 or 4% of the charge was unreacted, that about 21% was low polymer in the $C_{10}$ to $C_{17}$ range, that about 61% was $C_{18}$ polymer and only about 14% was heavier polymer.

Butylene codimers (produced by the polymerization of a butane-butylene stream over phosphoric acid catalyst) are not so readily polymerized by alkanesulfonic acid and it appears that there is some selectivity for isobutylene dimer polymerization. The alkanesulfonic acid catalyst polymerized butylene codimers to an entirely different type of polymer product than that obtained under similar conditions with an aromatic sulfonic acid catalyst like toluenesulfonic acid.

While the invention has been described with respect to a particular flow sheet and while numerous examples have been given of results obtainable under specific operating conditions it should be understood that the invention is not limited to the precise flow sheet or conditions hereinabove recited since various flow sheet modifications and alternative operating conditions will be apparent from the above description to those skilled in the art. Polymer formation may be obtained with a ratio of alkanesulfonic acid to olefins in the range of .01:1 to 2:1 or more altho it is preferably in the range hereinabove described. Also the polymerization temperature may exceed the 240 or 250° F. (the preferred upper temperature limit) at least during a portion of the polymerization reaction since considerable heat is liberated by the reaction itself. The pressure is preferably sufficient to maintain liquid phase conversion conditions. Even if polymerization is effected by contacting olefins with alkanesulfonic acids in the higher temperature range it appears that the first step of the reaction is to form an alkanesulfonic acid ester of the formula $RSO_3R'$ where R is an alkyl radical having 1 to 5 carbon atoms and R' is an alkyl radical having the same number of carbon atoms as the olefin; this ester reacts in the presence of catalytic quantities of alkanesulfonic acid and the olefinic hydrocarbon product is derived from the R' radical.

If the olefin stream initially charged to the process contains isobutylene the stream may be initially contacted with alkanesulfonic acid at about room temperature and for a short contact time, e. g. about 2 to 20 minutes, in order to selectively polymerize the isobutylene; the polymer may then be separated from acid, the polymer phase heated to effect polymerization of any ester which may be dissolved in the polymer phase and both the acid and the unreacted gases from the initial contacting step may be introduced to tower 12 for effecting the esterification of propylene and normal butenes while leaving the ethylene unreacted. If the refinery stream contains acetylene, such acetylene will pass overhead with the unreacted ethylene stream but it can be easily separated therefrom by means of mercury salts, copper chloride, etc. in acid solution in accordance with processes which are well known in the art. It is much more difficult to separate propylene from ethylene and the present invention provides an extremely simple and efficient method for accomplishing this more difficult separation.

I claim:

1. The method of utilizing selective esterification of a secondary olefin with alkanesulfonic acid to effect removal of said secondary olefin from a hydrocarbon stream containing said secondary olefin and also containing ethylene, which method comprises contacting said stream at a temperature above 40° F. but below 140° F. with an alkanesulfonic acid containing not more than 5 carbon atoms per molecule and having an acid concentration higher than 80%, employing a time of contact of about 10 minutes to about 60 minutes sufficient to effect reaction of said secondary olefin with alkanesulfonic acid to form an alkensulfonic acid ester phase, and removing from the acid-ester phase unreacted ethylene which is substantially free from secondary olefin.

2. The method of claim 1 which includes the further steps of cooling said acid-ester phase to a temperature sufficiently low to effect separation of an aqueous acid phase, removing said aqueous acid phase, neutralizing the remaining acid-ester mixture and washing the neutralized mixture to effect removal of all free acid therefrom, drying the acid-free esters and distilling dried esters at reduced pressure in the absence of free acid.

3. The method of claim 1 which includes the further steps of heating said acid-ester phase to a temperature above 140° F. but not higher than 250° F. for converting said ester to alkanesulfonic acid and a polymer of said secondary olefin and returning said alkanesulfonic acid to said contacting step.

WAYNE A. PROELL.

REFERENCES CITED

The following references are of record in the file of this patent:

UNITED STATES PATENTS

| Number | Name | Date |
|---|---|---|
| 1,929,870 | Isham | Oct. 10, 1933 |
| 2,007,159 | Engs et al. | July 9, 1935 |
| 2,133,732 | Huyser et al. | Oct. 18, 1938 |
| 2,409,727 | Bailey | Oct. 22, 1946 |

FOREIGN PATENTS

| Number | Country | Date |
|---|---|---|
| 417,482 | Great Britain | Sept. 2, 1937 |
| 804,591 | France | Oct. 27, 1936 |